(12) United States Patent
Dreux et al.

(10) Patent No.: US 10,308,883 B2
(45) Date of Patent: Jun. 4, 2019

(54) PROCESS FOR DESULFURIZING CRACKED NAPHTHA

(71) Applicants: IFP Energies nouvelles, Rueil-Malmaison (FR); Axens, Rueil Malmaison (FR)

(72) Inventors: Heloise Dreux, Lyons (FR); Romina Digne, Lyons (FR); Frederic Feugnet, Lyons (FR); Jean-Michel Besnault, Le Vesinet (FR); Geoffrey Dubin, Houston, TX (US)

(73) Assignees: AXENS, Rueil Malmaison (FR); IFP ENERGIES NOUVELLES, Rueil-Malmaison (FR)

( * ) Notice: Subject to any disclaimer, the term of this patent is extended or adjusted under 35 U.S.C. 154(b) by 11 days.

(21) Appl. No.: 14/877,471

(22) Filed: Oct. 7, 2015

(65) Prior Publication Data

US 2017/0101590 A1    Apr. 13, 2017

(51) Int. Cl.
*C10G 45/00* (2006.01)
*C10G 45/02* (2006.01)
(Continued)

(52) U.S. Cl.
CPC .......... *C10G 45/02* (2013.01); *B01D 3/007* (2013.01); *C10G 7/00* (2013.01); *C10G 7/12* (2013.01);
(Continued)

(58) Field of Classification Search
CPC .......... C10G 45/02; C10G 45/32; C10G 7/00; C10G 69/02; C10G 69/04; C10G 69/06; B01D 3/322
See application file for complete search history.

(56) References Cited

U.S. PATENT DOCUMENTS 3,536,610 A * 10/1970 Stork .................... B01D 3/14
                                                              203/98
5,346,593 A    9/1994 Cialkowski et al.
(Continued)

FOREIGN PATENT DOCUMENTS

EP          0755995 A1    1/1997

OTHER PUBLICATIONS

Peters et al., Plant Design and Economics for Chemical Engineers, Chapter 9 Optimum Design and Design Strategy (McGraw-Hill 2003), pp. 414-433.*

*Primary Examiner* — Prem C Singh
*Assistant Examiner* — Brandi M Doyle
(74) *Attorney, Agent, or Firm* — Millen, White, Zelano and Branigan, P.C.

(57) ABSTRACT

A process for desulfurizing a cracked naphtha containing organic sulfur compounds:
  a) feeding the cracked naphtha to a distillation column comprising a bottom reboiler;
  b) fractionating said cracked naphtha into a light naphtha fraction and a heavy naphtha fraction which is removed as bottoms from the distillation column;
  c) feeding the heavy naphtha fraction and hydrogen to a hydrodesulfurization unit containing a hydrodesulfurization catalyst to produce a desulfurized heavy naphtha effluent.

The process further includes providing heat to the distillation column by an intermediate reboiler powered with a heat source having a temperature lower than that one of the bottom reboiler.

14 Claims, 1 Drawing Sheet

(51) Int. Cl.

| | | |
|---|---|---|
| *C10G 7/00* | (2006.01) | |
| *B01D 3/00* | (2006.01) | |
| *C10G 65/04* | (2006.01) | |
| *C10G 7/12* | (2006.01) | |
| *C10G 9/00* | (2006.01) | |
| *C10G 11/00* | (2006.01) | |

(52) U.S. Cl.
CPC ............... *C10G 9/00* (2013.01); *C10G 11/00* (2013.01); *C10G 65/04* (2013.01); *C10G 2300/1044* (2013.01)

(56) References Cited

U.S. PATENT DOCUMENTS

| | | |
|---|---|---|
| 5,597,476 A | 1/1997 | Hearn et al. |
| 5,906,730 A | 5/1999 | Hatanaka et al. |
| 6,334,948 B1 | 1/2002 | Didillon et al. |
| 2001/0047952 A1 | 12/2001 | Podrebarac et al. |
| 2001/0050245 A1 | 12/2001 | Hearn et al. |
| 2002/0005373 A1* | 1/2002 | Gupta ................... C10G 45/00 208/58 |
| 2003/0094399 A1 | 5/2003 | Podrebarac |
| 2003/0209467 A1 | 11/2003 | Didillon et al. |
| 2004/0195151 A1 | 10/2004 | Podrebarac et al. |
| 2009/0101545 A1 | 4/2009 | Picard et al. |
| 2010/0224536 A1* | 9/2010 | Schultz ................... B01D 3/14 208/363 |
| 2015/0158835 A1 | 6/2015 | Derking et al. |

\* cited by examiner

PROCESS FOR DESULFURIZING CRACKED NAPHTHA

FIELD OF THE INVENTION

The present invention relates to a process to desulfurize cracked naphtha.

DESCRIPTION OF PRIOR ART

The production of reformulated gasolines satisfying the latest environmental specifications primarily requires reducing the concentration of olefins and/or aromatics (especially benzene) and sulfur (including mercaptans). Catalytically cracked gasoline has a high olefin content, and almost 90% of the sulfur present in reformulated gasoline in particular is attributable to catalytic cracking gasoline (FCC, fluid catalytic cracking, or fluidized bed catalytic cracking). Desulfurizing (hydrodesulfurizing) gasoline and principally FCC gasoline is thus of clear importance.

Hydrotreating (hydrodesulfurizing) the feed sent for catalytic cracking results in gasoline which typically contains 100 ppm of sulfur. Units for hydrotreating catalytically cracked feeds operate, however, under severe temperature and pressure conditions, which thus means a substantial investment. Further, the whole of the feed has to be desulfurized, which means that very large volumes of feed have to be treated.

When carried out under conventional conditions which are known to the skilled person, hydrodesulfurizing catalytic cracking gasoline can reduce the sulfur content of the cut. However, that process has the major disadvantage of causing a very substantial drop in the octane number of the cut because of saturation of all of the olefins during the hydrotreatment.

Separating a light and a heavy gasoline before hydrotreating has already been disclosed in U.S. Pat. No. 4,397,739. That patent claims a process for hydrodesulfurizing gasoline comprising fractionating the gasoline into a light fraction and a heavy fraction and hydrodesulfurizing said heavy fraction.

Further, U.S. Pat. No. 4,131,537 teaches that it is important to fractionate the gasoline into several cuts, preferably three, as a function of their boiling point, and desulfurizing them under conditions which can be different. That patent also indicates that the major benefit is obtained when the gasoline is fractionated into three cuts and when the cut with intermediate boiling points is treated under mild conditions.

European patent application EP A 0 725 126 describes a process for hydrodesulfurizing a cracked gasoline in which the gasoline is separated into a plurality of fractions comprising at least a first fraction which is rich in compounds which are easy to desulfurize and into a second fraction which is rich in compounds which are difficult to desulfurize. Before carrying out that separation, the distribution of the sulfur-containing products must be determined by analysis. Such analyses are necessary to be able to select the apparatus and the separation conditions.

That application also claims that the olefin content and octane number of a light fraction of cracked gasoline fall substantially when it is desulfurized without being fractionated. In contrast, fractionation of that light fraction into 7 to 20 fractions followed by analysis of the sulfur contents and olefin contents of those fractions enables the fraction or fractions which are richest in sulfur-containing compounds to be determined, which fractions are then desulfurized simultaneously or separately and mixed with other desulfurized or non desulfurized fractions. Such a procedure is complex and must be repeated every time the composition of the gasoline to be treated is changed.

U.S. Pat. No. 5,290,427 has proposed processes for hydrotreating gasoline consisting of fractionating the gasoline then desulfurizing the fractions and converting the desulfurized fractions on a ZSM-5 zeolite to compensate for the octane number loss by isomerisation.

U.S. Pat. No. 5,318,690 proposes a process with fractionation of the gasoline and sweetening of the light fraction, while the heavy fraction is desulfurized, then converted on ZSM-5 and desulfurized again under mild conditions.

In the above-mentioned prior art, separation (or fractionation) of the catalytically cracked naphtha is usually realized with a distillation column in which the supply of heat necessary for fractionation, is performed by means of a bottom reboiler. Generally, high pressure steam or fuel is used to provide the heat to the bottom reboiler which is, in both cases, very expensive and energy intensive.

SUMMARY OF THE INVENTION

It is an object of the invention to provide an improved process, for desulfurizing a cracked naphtha containing sulfur compounds, in terms of energy efficacy and which therefore allows lowering the operating cost of the desulfurization process.

To this end, the invention concerns a process for desulfurizing a cracked naphtha containing organic sulfur compounds comprising the following steps:
a) feeding the cracked naphtha to a distillation column comprising a bottom reboiler;
b) fractionating said cracked naphtha into a light naphtha fraction and a heavy naphtha fraction which is removed as bottoms from the distillation column;
c) feeding the heavy naphtha fraction and hydrogen to a hydrodesulfurization unit containing a hydrodesulfurization catalyst to produce a desulfurized heavy naphtha effluent;

the process further comprises the following steps:
d) withdrawing an intermediate naphtha fraction as a side draw from the distillation column at a side draw tray located below the feed inlet and above the heavy naphtha fraction bottom outlet;
e) heating said intermediate naphtha fraction at a lower temperature than the bottom reboiler, with an intermediate reboiler supplied with a heat source having a temperature lower than the bottom reboiler;
f) recycling the heated intermediate naphtha fraction to the distillation column at the intermediate naphtha fraction side draw tray or at a tray located below the intermediate naphtha fraction side draw tray of the column and above the lowermost tray of the distillation column.

Thus according to the invention, the required heat to run the distillation column is in part brought by indirect heat exchange between the intermediate naphtha fraction and a hot stream via an intermediate reboiler. Since the intermediate reboiler provides heat at a lower temperature than the bottom reboiler, it is possible to use as heat source a hot stream generated by the process itself or any hot stream produced in a refinery where the process is integrated. The heat integration scheme according to the invention therefore allows lowering the energy consumption of the bottom reboiler and by way of consequence the operating cost of the overall hydrodesulfurization process.

According to a first embodiment of the process according to the invention, the intermediate reboiler is supplied with the desulfurized heavy naphtha effluent as heat source. Alternatively, the intermediate reboiler is supplied with any process stream of a refinery as heat source.

According to a preferred embodiment, the side draw tray has a temperature at least 10° C., preferably at least 20° C., more preferably at least 30° C. lower than the temperature of the lowermost tray of the column (i.e. the tray located in the stripping section of the column).

In the process of the invention, the heated intermediate naphtha fraction is preferably recycled at a tray located below the side draw tray and wherein said tray has a temperature comprised between the temperature of the heated intermediate naphtha fraction and the temperature of the side draw tray.

The cracked naphtha which can be treated by the process is a thermally or catalytically cracked naphtha. Preferably, the cracked naphtha is a gasoline having a boiling point in the range from the boiling points of hydrocarbons having five carbon atoms (C5) to 250° C.

According to a variation of the process, prior to step a) the cracked naphtha is treated in the presence of hydrogen in selective hydrogenation unit and the effluent recovered from the selective hydrogenation unit is sent to step a). This embodiment is advantageous when the cracked naphtha contains diolefinic compounds, which are responsible for fouling of the distillation column and for the deactivation of the hydrodesulfurization catalyst since these compounds are prone to form gums by polymerization.

In a preferred embodiment, the distillation column is operated and configured such that the cut point between the light naphtha fraction and the heavy naphtha fraction is at a temperature below 160° C. Preferably the cut point is between 50° C. and 100° C., and more preferably between 55 and 70° C. According to a preferred embodiment, the light naphtha fraction consists essentially of hydrocarbons with 5-6 carbon atoms and the heavy naphtha fraction consists essentially of hydrocarbons with 6-12 carbon atoms.

According to another embodiment, the heavy cracked naphtha fraction is treated in a hydrodesulfurization unit comprising at least one reactor including a hydrodesulfurization catalyst bed, in the presence of hydrogen, at a temperature of about 160 to 420° C., at a pressure of about 0.5 to about 8 MPa, at a liquid space velocity of about 0.5 to 10 $h^{-1}$ and with an H2/heavy cracked naphtha fraction ratio of about 100 to 600 liters per liter.

In a variation, the heavy cracked naphtha fraction is treated in a hydrodesulfurization unit comprising first and a second reactor in series, each including a hydrodesulfurization catalyst bed, in the presence of hydrogen, at a temperature of about 160 to 420° C., at a pressure of about 0.5 to about 8 MPa, at a liquid space velocity of about 0.5 to 10 $h^{-1}$ and with an H2/heavy cracked naphtha fraction ratio of about 100 to 600 liters per liter and wherein the temperature of the second reactor is higher than that one of the first reactor.

In a further embodiment, the light cracked naphtha fraction is treated in a hydrodesulfurization unit. The low sulfur content light naphtha fraction recovered from the hydrodesulfurization unit can be used as a feed to an etherification or alkylation unit or as a blending stream to a gasoline pool.

BRIEF DESCRIPTION OF THE DRAWINGS

These and further aspects of the invention will be explained in greater detail by way of example and with reference to the accompanying drawings in which.

The figures are not drawn to scale. Generally, identical components are denoted by the same reference numerals in the figures.

DETAILED DESCRIPTION OF PREFERRED EMBODIMENTS

The process of the present invention involves a process for producing a low sulfur content naphtha, which is for instance suitable for being used in a gasoline pool, from a cracked naphta which contains valuable olefin compounds.

Typically, the cracked naphtha which is treated by the instant process has a boiling point range from about the boiling points of hydrocarbons containing 5 carbon atoms (C5) to about 250° C. The end point of the cracked naphtha feed depends on the refinery from which it originates and market constraints, but generally remains within the limits indicated above.

As a general term, the process of the invention comprises separating the cracked naphtha into two fractions: a light naphtha fraction and heavy naphtha fraction constituted by the heavy naphtha fraction which is complementary to the light naphtha fraction. The separation or fractionation is realized with a distillation column provided with a plurality of trays, well known to the skilled person.

In general, the cut point is selected so as to maximize the olefin content in the light naphtha fraction. This content can readily be determined, for example by means of a bromine number determination.

Generally the cut point is less than 160° C. Preferably the cut point is between 50° C. and 100° C., and more preferably between 55 and 70° C.

The heavy naphtha fraction recovered as bottoms from the distillation column is hydrodesulfurized in a catalytic hydrodesulfurization unit in the presence of hydrogen and a hydrotreatment (hydrodesulfurization) catalyst comprising a group VIII metal and a group VIB metal deposited on an inert support.

In a preferred embodiment, when the cracked naphtha feed to be desulfurized contains polyolefins (diolefins), it is advantageous to carry out selective hydrogenation of the cracked naphtha before fractionation.

Figure 1:
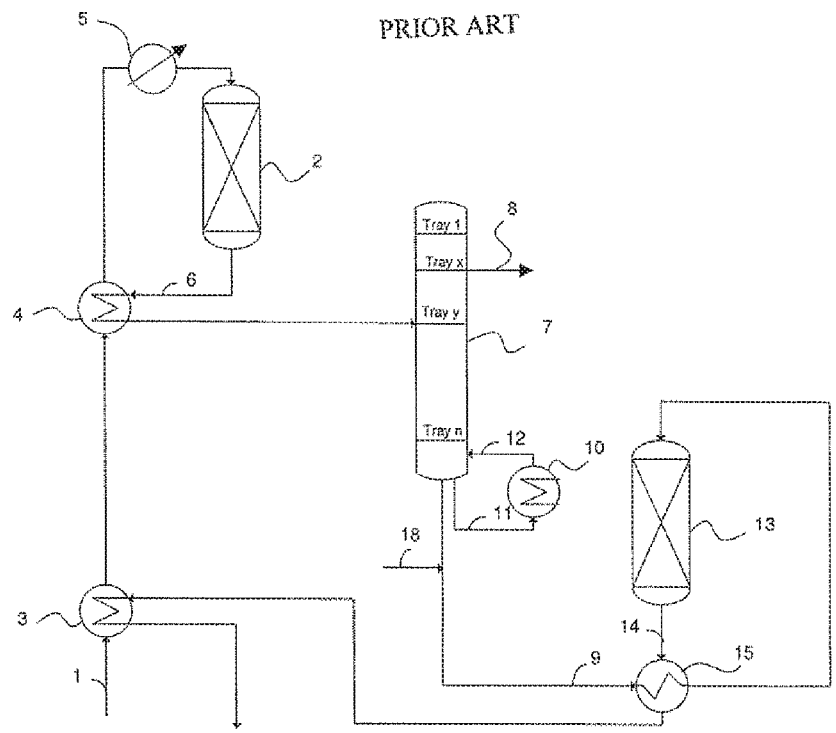
FIG. 1 shows a flow diagram of a prior art process for desulfurizing a catalytically cracked naphtha.
Figure 2:
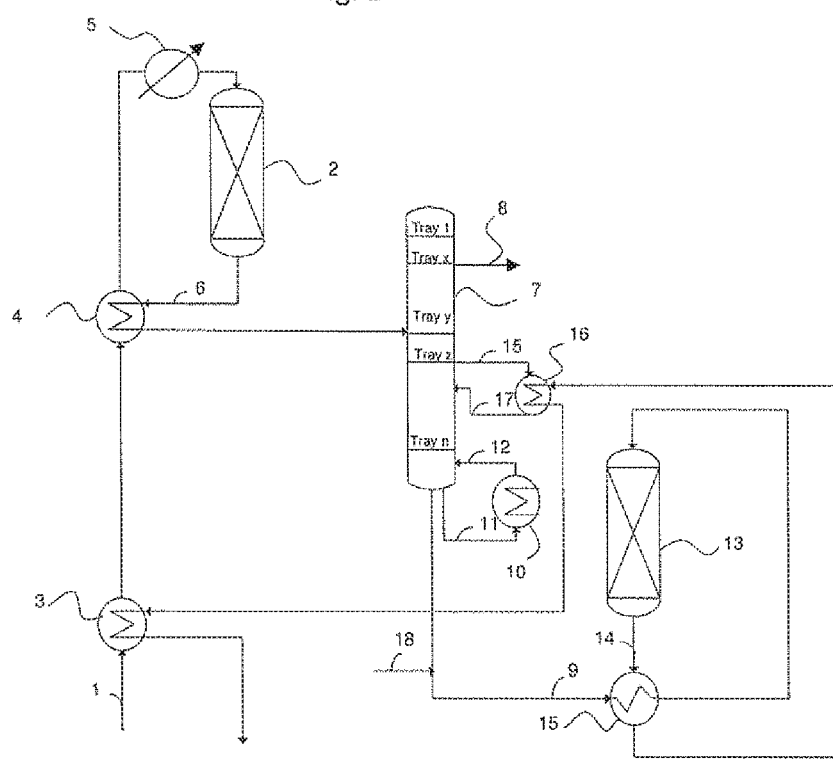
FIG. 2 shows a flow diagram of an embodiment of the process according to the invention for desulfurizing a catalytically cracked naphtha.

Referring now to FIG. 1, there is depicted a simplified diagram of a process of the prior art. FIG. 2 shows a simplified flow diagram of the process according to the present invention which differs from that one of FIG. 1 by the distillation system which is implemented. In the Figure of the invention, the naphtha feed to be treated, which comprises sulfur-containing compounds, boils in the gasoline boiling range, namely in the range of C5 to 250° C. The process is useful on the naphtha boiling range material from thermal or catalytic cracker products because they contain desired valuable olefins and unwanted sulfur compounds. The sulfur-containing species in the feeds treated by the process of the invention can be mercaptans or heterocyclic compounds such as thiophenes or alkylthiophenes, or heavier compounds such as benzothiophene.

The hydrocarbon feedstock is preferably a gasoline cut produced by catalytic cracking (FCC) which contains olefins at a concentration ranging from 5 to 60% by weight.

The sulfur content of the naphtha cuts produced by catalytic cracking (FCC) depends on the sulfur content of the feed treated by FCC, and on the end point of the cut. Light fractions, of course, have a lower sulfur fraction than heavier fractions. In general, the sulfur contents of the whole cracked naphtha cut, in particular those from FCC, are more than 100 ppm by weight and usually more than 500 ppm by weight. For cracked naphtha with end points of over 200° C., the sulfur contents are usually more than 1000 ppm by weight, and can in some cases reach values of the order of 4000 to 5000 ppm by weight.

The cracked naphtha feed is sent via line 1 to a selective hydrogenation unit 2 which, in FIG. 2, comprises a reactor, e.g. a fixed bed reactor, containing a selective hydrogenation catalyst suitable for diolefin hydrogenation. This hydrogenation step is optional but advantageous when the cracked naphtha comprises diolefins compounds which are prone to polymerize and to form gums responsible for fouling of the operation units and catalyst deactivation. The diolefin hydrogenation step is generally carried out in the presence of a catalyst comprising at least one group VIII metal, preferably selected from the group formed by platinum, palladium and nickel, and an inert support. As an example, a catalyst containing 1% to 20% by weight of nickel deposited on an inert support such as alumina, silica or silica-alumina or a support containing at least 50% of alumina can be used. This hydrogenation step is operated at a pressure of 0.4 to 5 MPa, at a temperature of 50° C. to 250° C., with a liquid hourly space velocity of 1 to 10 $h^{-1}$. Another metal can be associated to form a bimetallic catalyst, such as molybdenum or tungsten.

Most generally, the operation is carried out under pressure in the presence of a quantity of hydrogen which is in slight excess with respect to the stoichiometric value necessary to hydrogenate the diolefins, preferably the quantity of H2 introduced is such that the molar ratio H2/polyunsaturated compounds is comprised between 1 and 10 mol/mol, preferably between 1 and 5 mol/mol. Hydrogen and the feed to be treated are injected into a reactor as an upflow or downflow, preferably with a fixed catalyst bed. The temperature is most generally in the range from about 50° C. to about 250° C., preferably in the range 60° C. to 220° C., more preferably in the range 100° C. to 200° C.

The pressure is sufficient to maintain more than 80%, preferably more than 95% by weight of the cracked naphtha to be treated in the liquid phase in the reactor; more generally, it is in the range 0.4 to 5 MPa, preferably more than 1 MPa. The pressure is advantageously in the range 1 to 4 MPa. The space velocity is in the range from about 1 to about 10 $h^{-1}$, preferably in the range 2 to 8 $h^{-1}$.

As shown in FIG. 2, the cracked naphtha feed is preheated before entering the selective hydrogenation unit 2, by indirect heat exchange implementing heat exchanger 3 and 4 which use respectively, as heat exchanging fluid, the hot effluent recovered from the hydrodesulfurization unit 13 (via line 14) and the hot effluent recovered from the selective hydrogenation unit 2 (via line 6). Generally, the pre-heated cracked naphtha feed is further heated with a heating device 5 before entering the selective hydrogenation unit 2.

The hydrogenated effluent which is removed from the reactor 2, via line 6, is fed to a distillation column 7 configured to fractionate the cracked naphtha into two fractions, a light naphtha fraction 8 and a heavy naphtha fraction 9 which are respectively withdrawn as side draw and bottoms streams. The cut point between these two fractions corresponds to the final boiling point (also known as the end point) of the light naphtha fraction, and to the initial boiling point (initial point) for the heavy naphtha. It is at a temperature which is generally between 50° C. and 100° C. as regards the boiling point, preferably between 55° C. and 70° C.

The heavy naphtha fraction 9 corresponds to the fraction which is complementary to the light naphtha fraction 8. As shown in FIG. 2, the light naphtha fraction and the heavy naphtha fraction are withdrawn respectively as an overheads stream from the rectification section of the distillation column and as bottoms stream from the stripping section of the distillation column.

The distillation column used in the process according to the invention is well known to the skilled person and it comprises a vertical cylindrical outer shell which contains internal elements to ensure a good contact between the liquid and gaseous flows which circulates therethrough at counter-current. The distillation zone of the column usually comprise at least 15 theoretical trays, preferably at least 20 theoretical trays. The trays are numbered starting from the rectification section down to the reboiling section.

As shown in FIG. 2, the distillation column comprises a bottom reboiler 10, whose function is to heat the bottom liquid withdrawn by line 11 (or bottom reboiler inlet) so as produce a vapor phase necessary to the distillation. The vapor phase is recycled back to the distillation column 7 by inlet line 12 (or bottom reboiler outlet) below the bottom tray of the column (tray n). The bottom reboiler 10 is powered by a high temperature source which can be e.g. high pressure steam or hot gas produced by fuel combustion. It should be appreciated that the distillation column also includes a reflux system not shown in the Figures for purposes of clarity.

The operation conditions of the distillation column 7 are generally the following: at a pressure below 1 MPa and with a temperature gradient in the column ranging between 60° C. and 250° C.

Preferably, the bottom reboiler is operated such that the bottom reboiler inlet temperature is 150° C. to 250° C. and more preferably 180 to 210° C.

The heavy naphtha fraction 9 is mixed with hydrogen and then undergoes hydrodesulfurization treatment carried out in a hydrodesulfurization unit 13 comprising at least one upflow or downflow reactor preferably with a fixed catalyst bed including a hydrotreatment catalyst adapted to convert the sulfur-containing compounds to H2S in the presence of hydrogen so as to produce a desulfurized effluent which satisfies the desired specifications as regards the sulfur content. The operating conditions for the hydrotreatment are adjusted to attain the desired degree of desulfurization. In general, at least 90% of the sulfur-containing compounds present in the heavy naphtha fraction are converted to H2S.

According to a preferred embodiment and when one seek to recover a very low sulfur content heavy naphtha fraction, the hydrodesulfurizatoin unit 13 comprises two hydrodesulfurization reactors arranged in series as taught in documents EP 755 995 and EP 1 174 485. In this case, the hydrodesulfurization unit can be operated with or without an intermediate $H_2S$ removal step. Preferably the effluent recovered from first hydrodesulfurization reactor is heated before being treated in the subsequent second hydrodesulfurization reactor which is operated at a higher temperature than the first hydrodesulfurization reactor, for instance the temperature difference between said reactors, ΔT, is about 20 to 60° C. and more preferably about 30 to 50° C.

The heavy naphtha fraction undergoes hydrotreatment in the presence of hydrogen with a catalyst containing at least one group VIII metal and/or at least one group VIB metal, at a temperature of about 160° C. to about 420° C., at a pressure which is generally about 0.5 to about 8 MPa. The liquid space velocity is about 0.5 to about 10 h$^{-1}$ (expressed as the volume of liquid per volume of catalyst per hour), preferably 1 to 6 h$^{-1}$. The (H2/heavy naphtha fraction) ratio is adjusted as a function of the desired degree of desulfurization to about 100 to 600 liters per liter, preferably 150 to 500 liters per liter. The temperature is preferably 200° C. to 380° C. The pressure is preferably 1 to 4 MPa.

The hydrodesulfurization catalyst generally comprises at least one group VIII metal (metals from groups 8, 9 and 10 of the new classification, i.e., iron, ruthenium, osmium, cobalt, rhodium, iridium, nickel, palladium or platinum) and at least one metal from group VIB (metals from group 6 of the new classification, i.e., chromium, molybdenum or tungsten), on a suitable support. The group VIII metal is generally nickel or cobalt, and the group VIB metals generally molybdenum or tungsten. Combinations such as nickel-molybdenum or cobalt-molybdenum are preferred. The catalyst support is normally a porous inert solid such as an alumina, a silica-alumina, or other porous solids such as magnesia, silica or titanium oxide, used alone or mixed with alumina or silica-alumina.

The hot hydrodesulfurized effluent recovered from the hydrotreatment unit 13 by line 14 can be used as a heat exchanging fluid in the indirect heat exchanger 15 to pre-heat the heavy naphtha fraction 9 and in the indirect heat exchanger 3 to pre-heat the cracked naphtha feed as explained above. The hydrodesulfurized effluent is either sent to the gasoline pool of the refinery or recombined with the light naphtha fraction and then the mixture is sent to the gasoline pool.

As shown in FIG. 2, in addition to the bottom reboiler 10, the distillation column implements an intermediate reboiler 16 connected to a side draw line 18 (or intermediate reboiler inlet) designed to extract an intermediate naphtha fraction. The side draw line 18 via tray z in the column is located above the bottom reboiler inlet 11 and below the feed inlet of the column. The temperature of tray z should be higher than the temperature of the feed tray and lower than the temperature of the heat source used in the intermediate reboiler so that said intermediate naphtha fraction can be heated by said heat source. Preferably, the side draw tray has a temperature at least 10° C., preferably at least 20° C., more preferably at least 30° C. lower than the temperature of the lowermost tray located in the bottom section (stripping section) of the column.

The intermediate reboiler 16 may be any heat exchanger capable of transferring heat from a heat source to the distillation zone of the column. According to the invention, the intermediate reboiler 16 can use as heat exchanging source (or fluid) an internal hot stream generated by the process or any hot stream produced in a refinery where the process is implemented. The temperature of the heat source supplied to the intermediate reboiler should be higher than the temperature of the withdrawn intermediate naphtha fraction. Preferably the supplied heat source has a temperature of at least 5° C., preferably at least 10° C., more preferably at least 20° C. above that one of the withdrawn intermediate naphtha fraction. As a preference, the intermediate reboiler is operated to supply heat to the distillation column at a temperature of 100° C. to 240° C., more preferably 130° C. to 210° C., and even more preferably 140° C. to 190° C. In the embodiment shown in FIG. 2, the heat exchanging source providing heat at a lower temperature than the bottom reboiler 10 is the desulfurized effluent 14 removed from the hydrodesulfurization unit 13.

According to the invention, the heated intermediate naphtha fraction collected downstream the intermediate reboiler 10 is recycled in the distillation column via line 17 at/or below the side draw tray and above the lowermost tray of the distillation column.

According to an embodiment, the tray where the heated intermediate naphtha fraction is recycled has substantially the same temperature as that one of the heated intermediate naphtha.

According to the invention, the heated intermediate naphtha fraction which is recycled may be as vapor or a mixture of vapor and liquid.

According to a variation of the process, the distillation column can includes more than one intermediate reboiler, for instance two intermediate reboilers, wherein each intermediate reboiler is supplied with heat provided by a portion of the hydrodesufurized effluent or any other internal stream of a refinery provided that the temperature of the heat source is higher that the intermediate naphtha fractions.

According to a variation of the process, it is also possible to extract from the distillation column a fourth naphtha stream, in addition to the light, intermediate and heavy naphtha fractions, as a supplemental side-draw stream. Said fourth steam is generally withdrawn from a tray situated above the intermediate side draw and below the feeding tray. For instance, the fourth naphtha stream which could be qualified as a "medium cracked naphtha" cut may comprise hydrocarbons having 6 to 8 carbon atoms per molecule or 6 to 7 carbon atoms per molecule.

It should be noted that in the context of the invention, the intermediate cracked naphtha withdrawn as side draw may not be totally heated in the intermediate reboiler. In this case, only a part of said intermediate cracked naphtha is recycled back to the distillation column while the complementary part is used as a product or as feedstock in another reactive unit.

The process according to the invention therefore allows energy saving by using a hot process stream as a supplemental heat input to the distillation column via the intermediate reboiler. Indeed, the presence of the intermediate reboiler assumes a share of overall energy duty for the distillation and is therefore able to reduce the duty of the bottom reboiler.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

EXAMPLES

The following example compares the energy consumption of the utilities for the hydrodesulfurization of a FCC gasoline implementing the process of FIGS. 1 and 2. The FCC gasoline is characterized by an initial boiling point of 35° C. and a final boiling point of 208° C., a RON number of 94.4 and a total sulfur content of 225 ppm weight. The FCC gasoline flowrate is 159 tons per hour.

Example 1 (Comparative)

The pre-heated FCC gasoline at 155° C. is heated at 160° C. with the heating device 5, which is a high pressure steam heat exchanger, and is treated in the selective hydrogenation unit 2 at 2.36 MPa (absolute).

The effluent removed from the selective hydrogenation unit 2 at 176° C. is sent to a distillation column 7 comprising 28 theoretical trays. The feed inlet of the distillation column is located at the $17^{th}$ theoretical tray (tray 1 being the uppermost tray). The column 7 is operated in the following conditions:

at 0.68 MPa (absolute) and 88° C. at the head of the column; and at 199° C. and 0.71 MPa (absolute) barg at the bottom of the column.

The column separates in its rectification section as overheads streams a sour gas and a light naphtha fraction (LCN for Light Cracked Naphtha) at a temperature of 105° C. and in its stripping section as bottoms, a heavy naphtha fraction (HCN for Heavy Cracked Naphtha) at a temperature of 190° C.

A part of the heavy naphtha fraction is heated at 199° C. by means of a bottom reboiler 10 comprising a high pressure steam heat exchanger and then returned in the column.

The other complementary part of the heavy naphtha fraction constitutes the feed for the hydrodesulfurization unit 13 comprising two hydrodesulfurization (HDS) reactors disposed in series which is operated with an intermediate heating device (fuel gas furnace) of the effluent recovered from the first HDS reactor. The HDS conditions are the following:

$1^{st}$ HDS reactor: $T_{inlet}$=260° C., $T_{outlet}$=267° C., $P_{inlet}$=2.35 MPa (absolute)

$2^{nd}$ HDS reactor: $T_{inlet}$=310° C., $T_{outlet}$=312° C., $P_{inlet}$=2 MPa (absolute)

Intermediate heating duty fuel gas furnace: 3.7 MW

Example 2 (According to the Invention)

Example 2 is based on the process according to the present invention. An intermediate naphtha fraction, withdrawn from the column at the $19^{th}$ theoretical tray (tray 1 being the uppermost tray) having an outlet temperature of 155° C., is heated in an intermediate reboiler (heat exchanger) which is supplied with the hydrodesulfurized effluent at 188° C. as heat source. The recovered intermediate naphtha fraction at 160° C. is then returned in the distillation column at the $20^{th}$ theoretical tray.

Table 1 gathers the energy duties to provide required heat to run the process according to FIG. 1 and FIG. 2.

TABLE 1

|  |  | Example 1 | Example 2 |
|---|---|---|---|
| Fuel gas (MW) | Intermediate heating between HDS 1 and HDS2 | 3.87 | 3.87 |
| HP steam (MW) | Heating device (5) | 0.55 | 0.55 |
|  | Bottom reboiler (10) | 14.66 | 11.36 |
| Heat DutyTotal (MW) |  | 19.08 | 15.78 |
| Saving (MW) |  | — | 3.3 |
| Saving (%) |  | — | 17.3 |

It can be appreciated that thanks to the implementation of the intermediate reboiler capable to provide heat at a lower temperature than the bottom reboiler, and supplied with the desulfurized heavy naphtha fraction as heat source, allows reducing the duty of the bottom reboiler leading to substantial operating cost savings.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated. Use of the article "a" or "an" preceding an element does not exclude the presence of a plurality of such elements.

The present invention has been described in terms of specific embodiments, which are illustrative of the invention and not to be construed as limiting. Thus a great number of modifications could be made to the distillation column, for example as theoretical trays numbers and column design as a whole could be varied whilst still accommodating a bottom reboiler and an intermediate reboiler which is capable to provide heat at a lower temperature than the bottom reboiler by means of an internal heat source.

The preceding examples can be repeated with similar success by substituting the generically or specifically described reactants and/or operating conditions of this invention for those used in the preceding examples.

The entire disclosures of all applications, patents and publications, cited herein are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for desulfurizing a cracked naphtha containing organic sulfur compounds comprising:

a) feeding the cracked naphtha to a distillation column comprising a bottom reboiler;

b) fractionating said cracked naphtha into a light naphtha fraction and a heavy naphtha fraction which is removed as bottoms from the distillation column;

c) feeding the heavy naphtha fraction and hydrogen to a hydrodesulfurization unit containing a hydrodesulfurization catalyst to produce a first desulfurized heavy naphtha effluent; the process further comprising:

d) heat exchanging the first desulfurized heavy naphtha effluent in a first indirect heat exchanger to pre-heat the heavy naphtha fraction and to provide a second desulfurized heavy naphtha effluent;

e) withdrawing an intermediate naphtha fraction as a side draw from the distillation column at a side draw tray located below the feed inlet and above the heavy naphtha fraction bottom outlet, wherein the side draw tray has a temperature at least 10° C. lower than the temperature of the lowermost tray of the column, and higher than the temperature of the feed tray;

f) heating said intermediate naphtha fraction at a lower temperature than the bottom reboiler, with an intermediate reboiler supplied with the desulfurized heavy naphtha effluent as a heat source having a temperature lower than the bottom reboiler and to provide a third desulfurized heavy naphtha effluent;

g) recycling the heated intermediate naphtha fraction to the distillation column at the intermediate naphtha fraction side draw tray or at a tray located below the intermediate naphtha fraction side draw tray of the column and above a lowermost tray of the distillation column h) heat exchanging the third desulfurized heavy naphtha effluent in a second indirect heat exchanger to pre-heat the cracked naphtha.

2. The process according to claim 1, wherein the intermediate reboiler is additionally supplied with a process stream of a refinery as a heat source.

3. The process according to claim 1, wherein the heated intermediate naphtha fraction is recycled at a tray located below the side draw tray and wherein said tray has a temperature between the temperature of the heated intermediate naphtha fraction and the temperature of the side draw tray.

4. The process according to claim 1, wherein the cracked naphtha is a thermally or catalytically cracked naphtha.

5. The process according to claim 1, wherein the cracked naphtha is a gasoline having a boiling point from the boiling points of hydrocarbons having five carbon atoms (C5) to 250° C.

6. The process according to claim 1, wherein prior to a) the cracked naphtha is treated in the presence of hydrogen in a selective hydrogenation unit and effluent recovered from the selective hydrogenation unit is sent to a).

7. The process according to claim 1, wherein the distillation column is operated and configured such that there is a cut point between the light naphtha fraction and the heavy naphtha fraction at a temperature below 160° C.

8. The process according to claim 7, wherein the cut point is 50° C. to 100° C.

9. The process according to claim 1, wherein the heavy cracked naphtha fraction is treated in a hydrodesulfurization unit comprising at least one reactor including a hydrodesulfurization catalyst bed, in the presence of hydrogen, at a temperature of 160 to 420° C., at a pressure of 0.5 to 8 MPa, at a liquid space velocity of 0.5 to 10 $h^{-1}$ and with an H2/heavy cracked naphtha fraction ratio of 100 to 600 liters per liter.

10. The process according to claim 1, wherein the heavy cracked naphtha fraction is treated in a hydrodesulfurization unit comprising a first and a second reactor in series, each including a hydrodesulfurization catalyst bed, in the presence of hydrogen, at a temperature of 160 to 420° C., at a pressure of 0.5 to 8 MPa, at a liquid space velocity of 0.5 to 10 $h^{-1}$ and with an H2/heavy cracked naphtha fraction ratio of 100 to 600 liters per liter and wherein the temperature of the second reactor is higher than that one of the first reactor.

11. The process according to claim 1, wherein the light cracked naphtha fraction is further treated in a hydrodesulfurization unit.

12. The process according to claim 1, wherein the side draw tray has a temperature at least 20° C. lower than the temperature of the lowermost tray of the column.

13. The process according to claim 1, wherein the side draw tray has a temperature at least 30° C. lower than the temperature of the lowermost tray of the column.

14. The process according to claim 7, wherein the cut point is 55° C. to 70 ° C.

* * * * *